United States Patent
Durham

(10) Patent No.: US 11,692,907 B2
(45) Date of Patent: Jul. 4, 2023

(54) DISHWASHING APPLIANCES AND METHODS FOR DETERMINING VALVE STATUS THEREIN

(71) Applicant: Haier US Appliance Solutions, Inc., Wilmington, DE (US)

(72) Inventor: Kyle Edward Durham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 178 days.

(21) Appl. No.: 16/911,563

(22) Filed: Jun. 25, 2020

(65) Prior Publication Data
US 2021/0404910 A1 Dec. 30, 2021

(51) Int. Cl.
| | |
|---|---|
| *G01M 13/003* | (2019.01) |
| *A47L 15/42* | (2006.01) |
| *A47L 15/22* | (2006.01) |
| *G01L 9/00* | (2006.01) |
| *F16K 37/00* | (2006.01) |

(52) U.S. Cl.
CPC ........... *G01M 13/003* (2019.01); *A47L 15/22* (2013.01); *A47L 15/4204* (2013.01); *A47L 15/4219* (2013.01); *A47L 15/4223* (2013.01); *A47L 15/4293* (2013.01); *F16K 37/0066* (2013.01); *G01L 9/007* (2013.01); *A47L 2401/14* (2013.01)

(58) Field of Classification Search
CPC .. G01M 13/003; A47L 15/22; A47L 15/4204; A47L 15/4219; A47L 15/4223; A47L 15/4293; A47L 2401/14; A47L 15/4246; A47L 2401/20; A47L 2501/26; A47L 15/0049; F16K 37/0066; G01L 9/007
See application file for complete search history.

(56) References Cited

U.S. PATENT DOCUMENTS

| | | | |
|---|---|---|---|
| 4,245,310 A | 1/1981 | Kiefer | |
| 4,509,543 A * | 4/1985 | Livingston | A47L 15/4293 704/200 |
| 6,432,216 B1 * | 8/2002 | Thies | A47L 15/0049 134/25.2 |
| 8,845,813 B2 * | 9/2014 | Pers | A47L 15/0031 134/25.2 |
| 9,565,987 B2 | 2/2017 | Defilippi | |
| 2009/0000671 A1 | 1/2009 | Montagnana | |
| 2013/0008477 A1 | 1/2013 | Forst | |
| 2017/0298839 A1 * | 10/2017 | Hill | F02C 9/46 |
| 2019/0159652 A1 * | 5/2019 | Durham | A47L 15/23 |
| 2019/0174990 A1 | 6/2019 | Durham | |

FOREIGN PATENT DOCUMENTS

CN 100427021 C 10/2008

* cited by examiner

*Primary Examiner* — Michael E Barr
*Assistant Examiner* — Pallavi Chitta
(74) *Attorney, Agent, or Firm* — Dority & Manning, P.A.

(57) ABSTRACT

Dishwashing appliances and methods, as provided herein, may include features or steps such as measuring a first pressure in a sump with a pressure sensor and storing the first pressure in a memory of the dishwashing appliance as a reference pressure. Dishwashing appliances and methods may further include features or steps for measuring a second pressure within the sump with the pressure sensor after measuring the first pressure, and determining that a check valve is failed when the second pressure exceeds the first pressure by at least a predetermined margin.

18 Claims, 6 Drawing Sheets

DISHWASHING APPLIANCES AND METHODS FOR DETERMINING VALVE STATUS THEREIN

FIELD OF THE INVENTION

The present subject matter relates generally to dishwashing appliances, and more particularly to features and methods for assessing the status of a check valve in a dishwashing appliance.

BACKGROUND OF THE INVENTION

Dishwashing appliances generally include a tub that defines a wash chamber. Rack assemblies can be mounted within the wash chamber of the tub for receipt of articles for washing. Multiple spray assemblies can be positioned within the wash chamber for applying or directing wash liquid (e.g., water, detergent, etc.) towards articles disposed within the rack assemblies in order to clean such articles. After being applied or directed towards the rack assemblies and/or articles therein, the wash liquid generally flows by gravity to or towards a bottom of the wash chamber, such as to a sump positioned at the bottom of the wash chamber. Dishwashing appliances are also typically equipped with one or more pumps, such as a circulation pump or a drain pump, for directing or motivating wash liquid from the sump to, e.g., the spray assemblies or an area outside of the dishwashing appliance.

Conventional dishwashing appliances also include a backflow preventer for limiting or preventing the drained wash liquid returning to the sump when the drain pump is deactivated. Typically, the backflow preventer includes a check valve which permits fluid communication in only one direction, e.g., from the sump to the drain pump.

Over time and after repeated use of a dishwashing appliance, sediment may accumulate within the sump and/or moving parts of the check valve may experience wear. If left unaddressed, these conditions may impair the function of the check valve. This may produce undesirable conditions, such as an excessive amount of dirty water returning to, e.g., flowing back into, the sump. Such dirty water may then undesirably be directed towards the articles to be cleaned within the dishwashing appliance.

Accordingly, dishwashing appliances that include features for addressing or monitoring the status of the check valve and methods therefor that address one or more of the challenges noted above would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a dishwashing appliance is provided. The dishwashing appliance includes a sump and a pressure sensor mounted to the sump. The dishwashing appliance also includes a check valve downstream from the sump along a fluid drain path and a drain pump downstream from the check valve along the fluid drain path. The method includes activating the drain pump followed by deactivating the drain pump. The method also includes determining the drain was successful based on a measurement of pressure within the sump. The measurement of pressure within the sump is measured by the pressure sensor. The method further includes starting a timer and taking a reference pressure after determining the drain was successful. When the timer expires, the method includes taking a second pressure. When the second pressure exceeds the reference pressure by at least a predetermined margin, the method includes determining that the check valve is failed.

In another exemplary aspect of the present disclosure, a method of operating a dishwashing appliance is provided. The dishwashing appliance includes a sump and a pressure sensor mounted to the sump. The dishwashing appliance also includes a check valve downstream from the sump along a fluid drain path and a drain pump downstream from the check valve along the fluid drain path. The method includes measuring, by the pressure sensor, a first pressure within the sump and storing the first pressure in a memory of the dishwashing appliance as a reference pressure. The method also includes measuring, by the pressure sensor, a second pressure within the sump after measuring the first pressure. When the second pressure exceeds the reference pressure by at least a predetermined margin, the method includes determining that the check valve is failed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
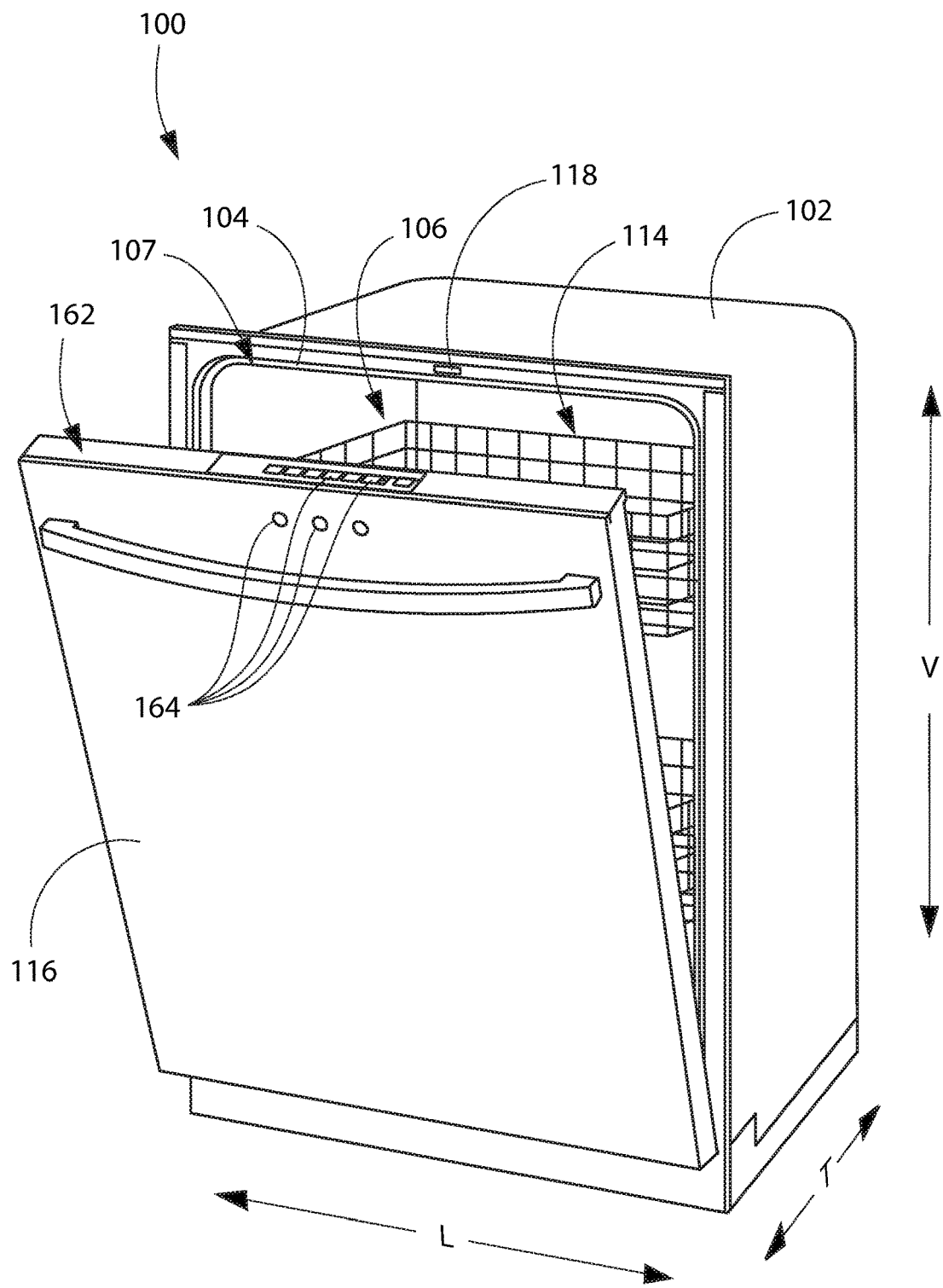
FIG. 1 provides a perspective view of an exemplary embodiment of a dishwashing appliance of the present disclosure with a door in a partially open position.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For instance, "upstream" refers to the flow direction from which the fluid flows, and "downstream" refers to the flow direction to which the fluid flows. The term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a wash liquid (e.g., water, detergent, or wash additive). The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "wash liquid" refers to a liquid used for washing or rinsing the articles that is typically made up of water and may include additives, such as detergent or other treatments (e.g., rinse aid). Furthermore, as used herein, terms of approximation, such as "approximately," "substantially," or "about," refer to being within a ten percent (10%) margin of error.

Figure 2:
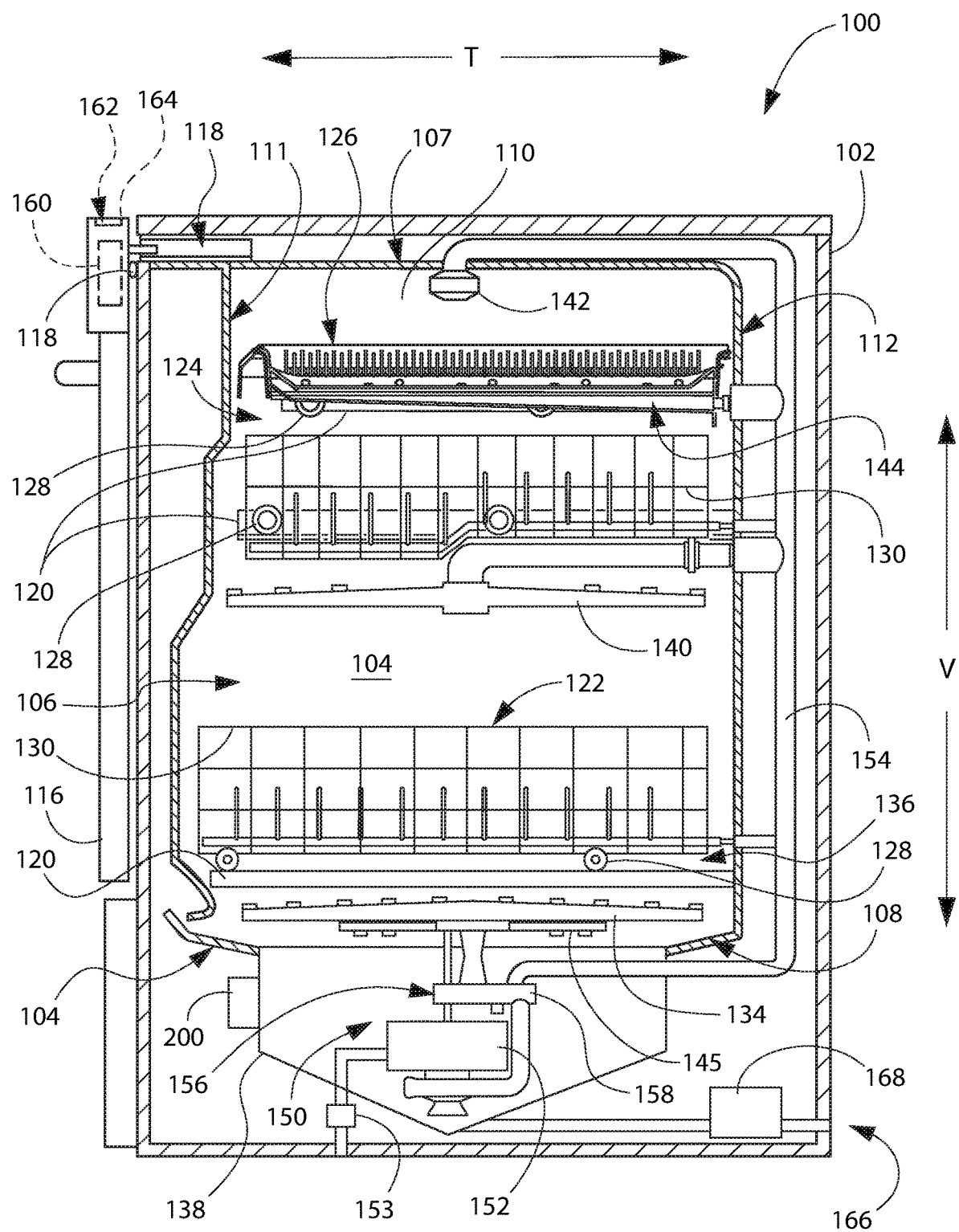
FIG. 2 provides a side, cross sectional view of the exemplary dishwashing appliance of FIG. 1.

Turning now to the figures, FIGS. 1 and 2 depict an exemplary dishwasher or dishwashing appliance (e.g., dishwashing appliance 100) that may be configured in accordance with aspects of the present disclosure. Generally, dishwasher 100 defines a vertical direction V, a lateral direction L, and a transverse direction T. Each of the vertical direction V, lateral direction L, and transverse direction T are mutually perpendicular to one another and form an orthogonal direction system.

Dishwasher 100 includes a cabinet 102 having a tub 104 therein that defines a wash chamber 106. As shown in FIG. 2, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114. In some embodiments, the dishwasher appliance 100 may also include a door 116 at the front opening 114. The door 116 may, for example, be hinged at its bottom for movement between a normally closed vertical position, wherein the wash chamber 106 is sealed shut for washing operation, and a horizontal open position for loading and unloading of articles from dishwasher 100. A door closure mechanism or assembly 118 may be provided to lock and unlock door 116 for accessing and sealing wash chamber 106.

In exemplary embodiments, tub side walls 110 accommodate a plurality of rack assemblies. For instance, guide rails 120 may be mounted to side walls 110 for supporting a lower rack assembly 122, a middle rack assembly 124, or an upper rack assembly 126. In some such embodiments, upper rack assembly 126 is positioned at a top portion of wash chamber 106 above middle rack assembly 124, which is positioned above lower rack assembly 122 along the vertical direction V.

Generally, each rack assembly 122, 124, 126 may be adapted for movement between an extended loading position (not shown) in which the rack is substantially positioned outside the wash chamber 106, and a retracted position (shown in FIGS. 1 and 2) in which the rack is located inside the wash chamber 106. In some embodiments, movement is facilitated, for instance, by rollers 128 mounted onto rack assemblies 122, 124, 126, respectively.

Although guide rails 120 and rollers 128 are illustrated herein as facilitating movement of the respective rack assemblies 122, 124, 126, it should be appreciated that any suitable sliding mechanism or member may be used according to alternative embodiments.

In optional embodiments, some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash liquid to reach and impinge on those articles (e.g., during a cleaning or rinsing cycle). According to additional or alternative embodiments, a silverware basket (not shown) is removably attached to a rack assembly (e.g., lower rack assembly 122), for placement of silverware, utensils, and the like, that are otherwise too small to be accommodated by the rack assembly.

Generally, dishwasher 100 includes one or more spray assemblies for urging a flow of fluid (e.g., wash liquid) onto the articles placed within wash chamber 106.

In exemplary embodiments, dishwasher 100 includes a lower spray arm assembly 134 disposed in a lower region 136 of wash chamber 106 and above a sump 138 so as to rotate in relatively close proximity to lower rack assembly 122.

In additional or alternative embodiments, a mid-level spray arm assembly 140 is located in an upper region of wash chamber 106 (e.g., below and in close proximity to middle rack assembly 124). In this regard, mid-level spray arm assembly 140 may generally be configured for urging a flow of wash liquid up through middle rack assembly 124 and upper rack assembly 126.

In further additional or alternative embodiments, an upper spray assembly 142 is located above upper rack assembly 126 along the vertical direction V. In this manner, upper spray assembly 142 may be generally configured for urging or cascading a flow of wash liquid downward over rack assemblies 122, 124, and 126.

In yet further additional or alternative embodiments, upper rack assembly 126 may further define an integral spray manifold 144. As illustrated, integral spray manifold 144 may be directed upward, and thus generally configured for urging a flow of wash liquid substantially upward along the vertical direction V through upper rack assembly 126.

In still further additional or alternative embodiments, a filter clean spray assembly 145 is disposed in a lower region 136 of wash chamber 106 (e.g., below lower spray arm assembly 134) and above a sump 138 so as to rotate in relatively close proximity to a filter assembly 210. For instance, filter clean spray assembly 145 may be directed downward to urge a flow of wash liquid across a portion of filter assembly 210 (FIG. 3) or sump 138.

The various spray assemblies and manifolds described herein may be part of a fluid distribution system or fluid circulation assembly 150 for circulating wash liquid in tub 104. In certain embodiments, fluid circulation assembly 150 includes a circulation pump 152 for circulating wash liquid in tub 104. Circulation pump 152 may be located within sump 138 or within a machinery compartment located below sump 138 of tub 104.

When assembled, circulation pump 152 may be in fluid communication with an external water supply line (not shown) and sump 138. A water inlet valve 153 can be positioned between the external water supply line and circulation pump 152 (e.g., to selectively allow water to flow from the external water supply line to circulation pump 152). Additionally or alternatively, water inlet valve 153 can be positioned between the external water supply line and sump 138 (e.g., to selectively allow water to flow from the external water supply line to sump 138). During use, water inlet valve 153 may be selectively controlled to open to allow the flow of water into dishwasher 100 and may be selectively controlled to cease the flow of water into dishwasher 100. Further, fluid circulation assembly 150 may include one or more fluid conduits or circulation piping for directing wash fluid from circulation pump 152 to the various spray assemblies and manifolds. In exemplary embodiments, such as that shown in FIG. 2, a primary supply conduit 154 extends from circulation pump 152, along rear 112 of tub 104 along the vertical direction V to supply wash liquid throughout wash chamber 106.

In some embodiments, primary supply conduit 154 is used to supply wash liquid to one or more spray assemblies (e.g., to mid-level spray arm assembly 140 or upper spray assembly 142). It should be appreciated, however, that according to alternative embodiments, any other suitable plumbing configuration may be used to supply wash liquid throughout the various spray manifolds and assemblies described herein. For instance, according to another exemplary embodiment, primary supply conduit 154 could be used to provide wash liquid to mid-level spray arm assembly 140 and a dedicated secondary supply conduit (not shown) could be utilized to provide wash liquid to upper spray assembly 142. Other plumbing configurations may be used for providing wash liquid to the various spray devices and manifolds at any location within dishwashing appliance 100.

Each spray arm assembly 134, 140, 142, integral spray manifold 144, filter clean assembly 145, or other spray device may include an arrangement of discharge ports or orifices for directing wash liquid received from circulation pump 152 onto dishes or other articles located in wash chamber 106. The arrangement of the discharge ports, also referred to as jets, apertures, or orifices, may provide a rotational force by virtue of wash liquid flowing through the discharge ports. Alternatively, spray assemblies 134, 140, 142, 145 may be motor-driven, or may operate using any other suitable drive mechanism. Spray manifolds and assemblies may also be stationary. The resultant movement of the spray assemblies 134, 140, 142, 145 and the spray from fixed manifolds provides coverage of dishes and other dishwasher contents with a washing spray. Other configurations of spray assemblies may be used as well. For instance, dishwasher 100 may have additional spray assemblies for cleaning silverware, for scouring casserole dishes, for spraying pots and pans, for cleaning bottles, etc.

In optional embodiments, circulation pump 152 urges or pumps wash liquid (e.g., from filter assembly 210) to a diverter 156 (FIG. 2). In some such embodiments, diverter 156 is positioned within sump 138 of dishwashing appliance 100). Diverter 156 may include a diverter disk (not shown) disposed within a diverter chamber 158 for selectively distributing the wash liquid to the spray assemblies 134, 140, 142, or other spray manifolds. For instance, the diverter disk may have a plurality of apertures that are configured to align with one or more outlet ports (not shown) at the top of diverter chamber 158. In this manner, the diverter disk may be selectively rotated to provide wash liquid to the desired spray device.

In exemplary embodiments, diverter 156 is configured for selectively distributing the flow of wash liquid from circulation pump 152 to various fluid supply conduits—only some of which are illustrated in FIG. 2 for clarity. In certain embodiments, diverter 156 includes four outlet ports (not shown) for supplying wash liquid to a first conduit for rotating lower spray arm assembly 134, a second conduit for supplying wash liquid to filter clean assembly 145, a third conduit for spraying an auxiliary rack such as the silverware rack, and a fourth conduit for supply mid-level or upper spray assemblies 140, 142 (e.g., primary supply conduit 154).

In some embodiments, an exemplary filter assembly 210 (FIG. 3) is provided. As illustrated for example in FIG. 3, in exemplary embodiments, filter assembly 210 is located in the sump 138, e.g., to filter fluid to circulation assembly 150 and/or drain pump 168. Generally, filter assembly 210 removes soiled particles from the liquid that flows to the sump 138 from the wash chamber 106 during operation of dishwashing appliance 100. In exemplary embodiments, filter assembly 210 includes both a first filter 212 (also referred to as a "coarse filter") and a second filter 214 (also referred to as a "fine filter").

In some embodiments, the first filter 212 is constructed as a grate having openings for filtering liquid received from wash chamber 106. The sump 138 includes a recessed portion upstream of circulation pump 152 or drain pump 168 and over which the first filter 212 is removably received. In exemplary embodiments, the first filter 212 may be a coarse filter having media openings in the range of about 0.030 inches to about 0.060 inches. The recessed portion may define a filtered volume wherein debris or particles have been filtered from the wash liquid by the first filter 212 or the second filter 214.

In additional or alternative embodiments, the second filter 214 is provided upstream of circulation pump 152 or drain pump 168. Second filter 214 may be non-removable or, alternatively, may be provided as a removable cartridge positioned in a tub receptacle 216 (FIG. 3) formed in sump 138.

Figure 3:
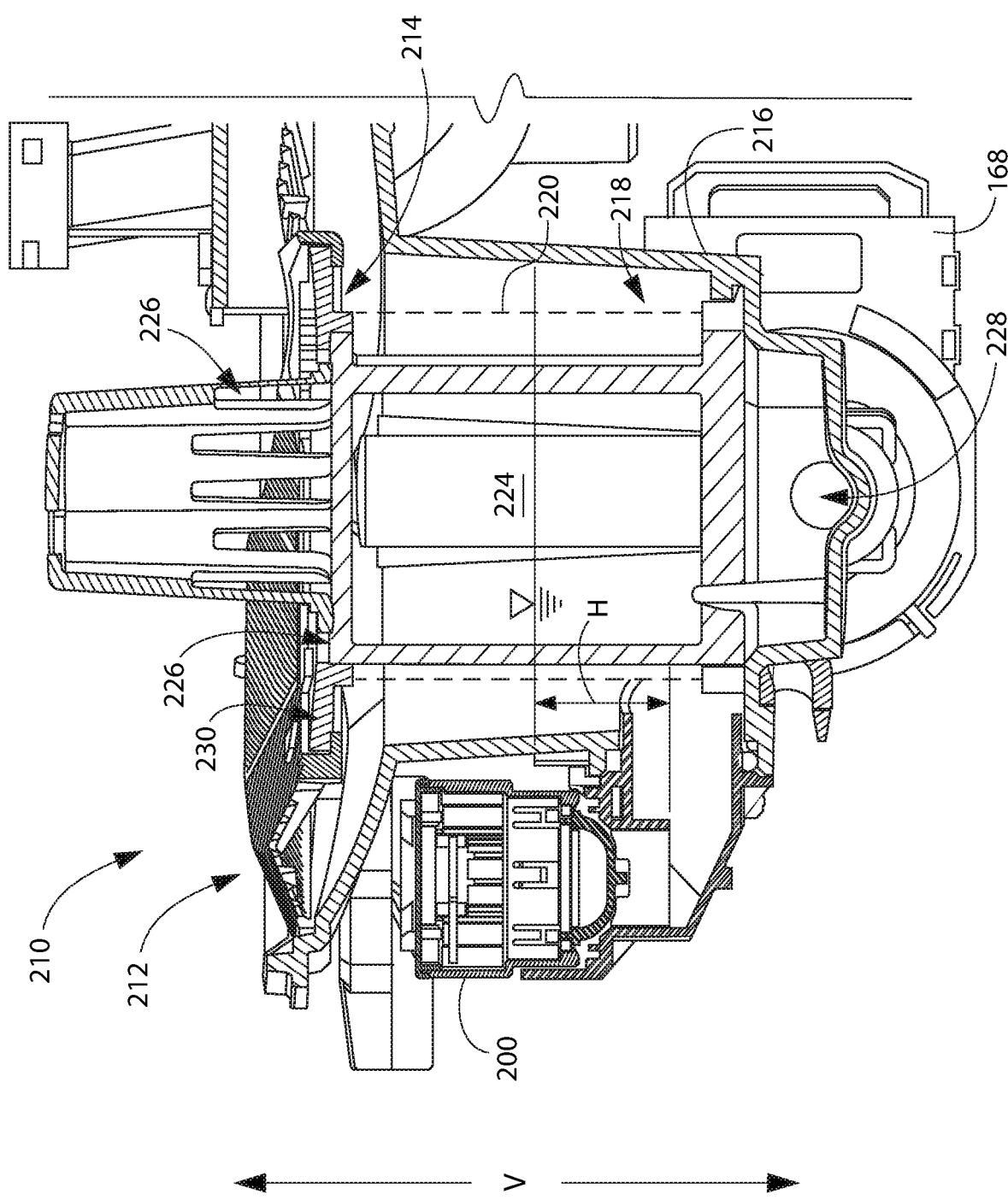
FIG. 3 provides a close up, sectioned view of a sump and a pressure sensor of the dishwashing appliance of FIGS. 1 and 2.

For instance, as illustrated in FIG. 3, the second filter 214 may be removably positioned within a collection chamber 218 defined by tub receptacle 216. The second filter 214 may be generally shaped to complement the tub receptacle 216. For instance, the second filter 214 may include a filter wall 220 that complements the shape of the tub receptacle 216. In some embodiments, the filter wall 220 is formed from one or more fine filter media. Some such embodiments may include filter media (e.g., screen or mesh, having pore or hole sizes in the range of about 50 microns to about 600 microns).

When assembled, the filter wall 220 may have an enclosed (e.g., cylindrical) shape defining an internal chamber 224. In optional embodiments, a top portion of second filter 214 positioned above the internal chamber 224 may define one or more openings 226 (e.g., vertical flow path openings), thereby permitting liquid to flow into the internal chamber 224 without passing through the first filter 212 or the fine filter media of the filter wall 220 of the second filter 214.

Between the top portion openings 226 and drain pump 168, internal chamber 224 may define an unfiltered volume, e.g., when liquid flows through the openings 226 into the internal chamber 224, the liquid is unfiltered in that the liquid did not flow through the filter media of the filter wall 220. A drain outlet 228 may be defined below the top portion openings 226 in fluid communication with internal chamber 224 and drain pump 168 (e.g., downstream of internal chamber 224 or upstream of drain pump 168).

During operation of some embodiments (e.g., during or as part of a wash cycle or rinse cycle), circulation pump 152 draws wash liquid in from sump 138 through filter assembly 210 (e.g., through first filter 212 or second filter 214). Thus, circulation pump 152 may be downstream of filter assembly 210.

Drainage of soiled wash liquid within sump 138 may occur, for instance, through drain assembly 166 (e.g., during or as part of a drain cycle). In particular, wash liquid may exit sump 138 through the drain outlet 228 and may flow through a drain conduit. In some embodiments, a drain pump 168 downstream of sump 138 facilitates drainage of the soiled wash liquid by urging or pumping the wash liquid to a drain line external to dishwasher 100. Drain pump 168 may be downstream of first filter 212 or second filter 214. Additionally or alternatively, an unfiltered flow path may be defined through sump 138 to drain conduit such that an unfiltered fluid flow may pass through sump 138 to drain conduit without first passing through filtration media of either first filter 212 or second filter 214.

For example, the unfiltered flow path may extend through the openings 226, whereby liquid may flow from a filter spillway 230 and into the internal chamber 224 from the top of the internal chamber 224, e.g., without passing through the wall 220 of the fine filter 214. Such unfiltered flow path may be available so long as a maximum height of liquid in the sump 138 is above the filter spillway 230, which may occur during a first portion of the drain cycle.

During, for example, a second portion of the drain cycle, when the maximum liquid height is below the filter spillway 230, at least a portion of wash liquid within sump 138 may generally pass into internal chamber 224 through second filter 214, e.g., through filter wall 220, before flowing through drain assembly 166 and from dishwashing appliance 100. The second portion of the drain cycle may occur when the liquid level within the sump 138 has been drawn below the filter spillway 230, whereby liquid can no longer bypass the filter wall 200 of second filter 214 via the openings 226.

Although a separate recirculation pump 152 and drain pump 168 are described herein, it is understood that other suitable pump configurations (e.g., using only a single pump for both recirculation and draining) may be provided.

In certain embodiments, dishwasher 100 includes a controller 160 configured to regulate operation of dishwasher 100 (e.g., initiate one or more wash operations). Controller 160 may include one or more memory devices and one or more microprocessors, such as general or special purpose microprocessors operable to execute programming instructions or micro-control code associated with a wash operation that may include a wash cycle, rinse cycle, or drain cycle. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry—such as switches, amplifiers, integrators, comparators, flip-flops, AND gates, and the like—to perform control functionality instead of relying upon software. It should be noted that controllers as disclosed herein are capable of and may be operable to perform any methods and associated method steps as disclosed herein.

Controller 160 may be positioned in a variety of locations throughout dishwasher 100. In optional embodiments, controller 160 is located within a control panel area 162 of door 116 (e.g., as shown in FIGS. 1 and 2). Input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of dishwasher 100. In some embodiments, user interface 164 includes a general purpose I/O ("GPIO") device or functional block. In additional or alternative embodiments, user interface 164 includes input components, such as one or more of a variety of electrical, mechanical or electromechanical input devices including rotary dials, push buttons, and touch pads. In further additional or alternative embodiments, user interface 164 includes a display component, such as a digital or analog display device designed to provide operational feedback to a user. When assembled, user interface 164 may be in operative communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For instance, different locations may be provided for user interface 164, different configurations may be provided for rack assemblies 122, 124, 126, different spray assemblies 134, 140, 142 and spray manifold configurations may be used, and other differences may be applied while remaining within the scope of the present disclosure.

Turning especially to FIG. 3, a close up, cross sectional view of sump 138 and a pressure sensor 200 is provided. In some instances, a backflow preventer or check valve 240 (FIGS. 4 and 5) of dishwasher 100 may become worn or obstructed, such that the check valve 240 is not able to close properly. Accordingly, and in accordance with exemplary aspects of the present disclosure, dishwasher 100 utilizes outputs from pressure sensor 200 to monitor or check the status of the check valve 240.

In some embodiments, pressure sensor 200 may be mounted to sump 138, e.g., as illustrated in FIG. 2. For instance, pressure sensor 200 may be mounted upstream of internal chamber 224 and second filter 214. Additionally or alternatively, pressure sensor 200 may be mounted downstream of first filter 212.

Pressure sensor 200 is operatively configured to detect a liquid level within sump 138 and communicate the liquid level to controller 160 (FIG. 2) via one or more signals. Thus, pressure sensor 200 and controller 160 are generally provided in operative communication.

During use, pressure sensor 200 may transmit signals to controller 160 for instance, as a frequency, as an analog signal, or in another suitable manner or form that can be received by controller 160 to detect a pressure value, e.g., as a value of relative pressure or hydrostatic pressure, such as value in units of $mmH_2O$. In certain embodiments, pressure sensor 200 is configured to sense the height H of the wash liquid above pressure sensor 200 along the vertical direction V (e.g., by detecting the pressure on pressure sensor 200).

In some embodiments, pressure sensor 200 includes a pressure plate that is generally acted on by the pressure of the wash liquid within sump 138. As the liquid level rises, the pressure plate is pushed upward along the vertical direction V and, thus, compresses air trapped within the housing and a diaphragm of pressure sensor 200. Compression may cause the diaphragm to flex or alter its position. As a result of the pressure and consequent movement of the diaphragm, a permanent magnet attached to the diaphragm may change its position in relation to a Hall-effect transducer. The transducer delivers one or more electrical signals proportional to the magnetic field of the magnet. Optionally, the signals from pressure sensor 200 may be linearized, digitized, or amplified before being sent to controller 160 for processing. Additionally or alternatively, the pressure sensor 200 may include a printed circuit board (PCB) board to electrically connect the various electrical components of pressure sensor 200. Moreover, pressure sensor 200 can be any suitable type of sensor capable of sensing the liquid level within dishwasher 100.

Figure 4:
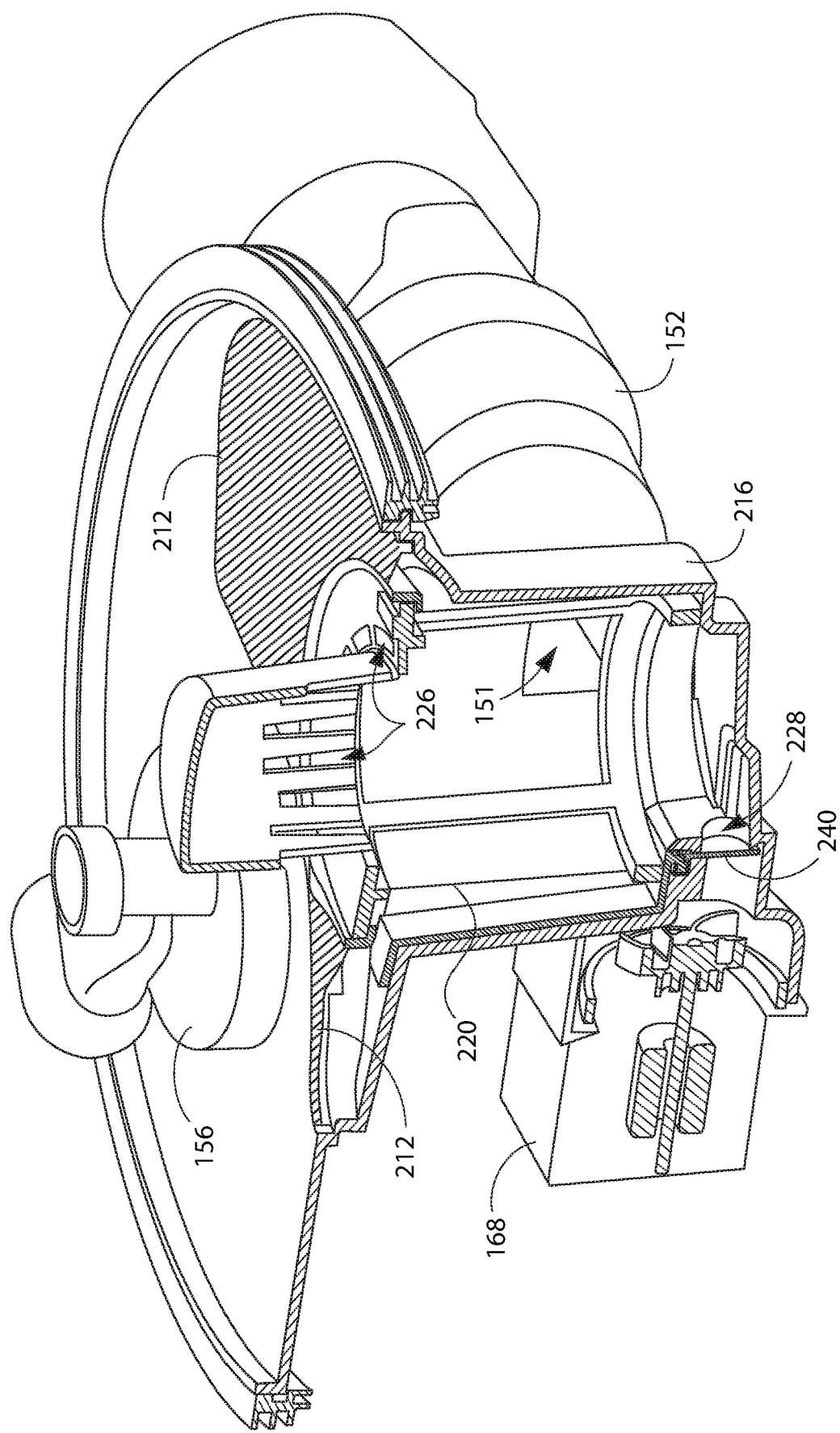
FIG. 4 provides a sectioned perspective view of the sump of the dishwashing appliance of FIGS. 1 and 2.
Figure 5:
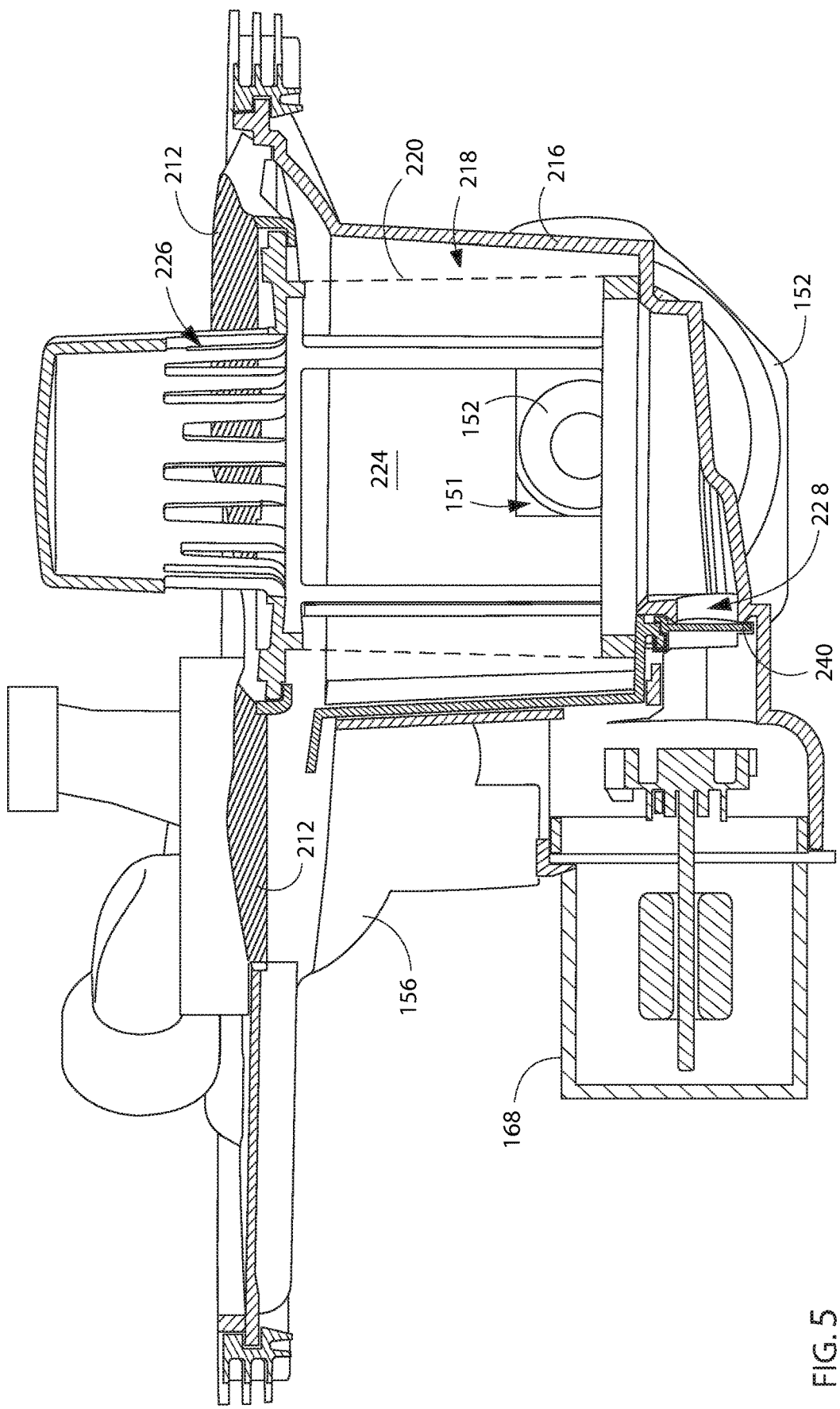
FIG. 5 provides another sectioned view of the sump of the dishwashing appliance of FIGS. 1 and 2.

Turning now to FIG. 4, a sectioned perspective view of the sump is provided, with the section in this view being taken through the drain pump 168 and a check valve 240 upstream of the drain pump 168. The check valve 240 is upstream of the drain pump 168 in that the check valve 240 is, e.g., between the sump 138 and the drain pump 168, such as between the collection chamber 218 and the drain pump 168, where the collection chamber 218 is defined within the sump 138 by tub receptacle 216. FIG. 5 provides a sectioned view of the sump along the same section plane as in FIG. 4, where FIG. 5 provides an orthogonal sectioned view. Also seen in FIGS. 4 and 5 is a recirculation inlet 151 which leads from the collection chamber 218 to the recirculation pump 152.

Figure 6:
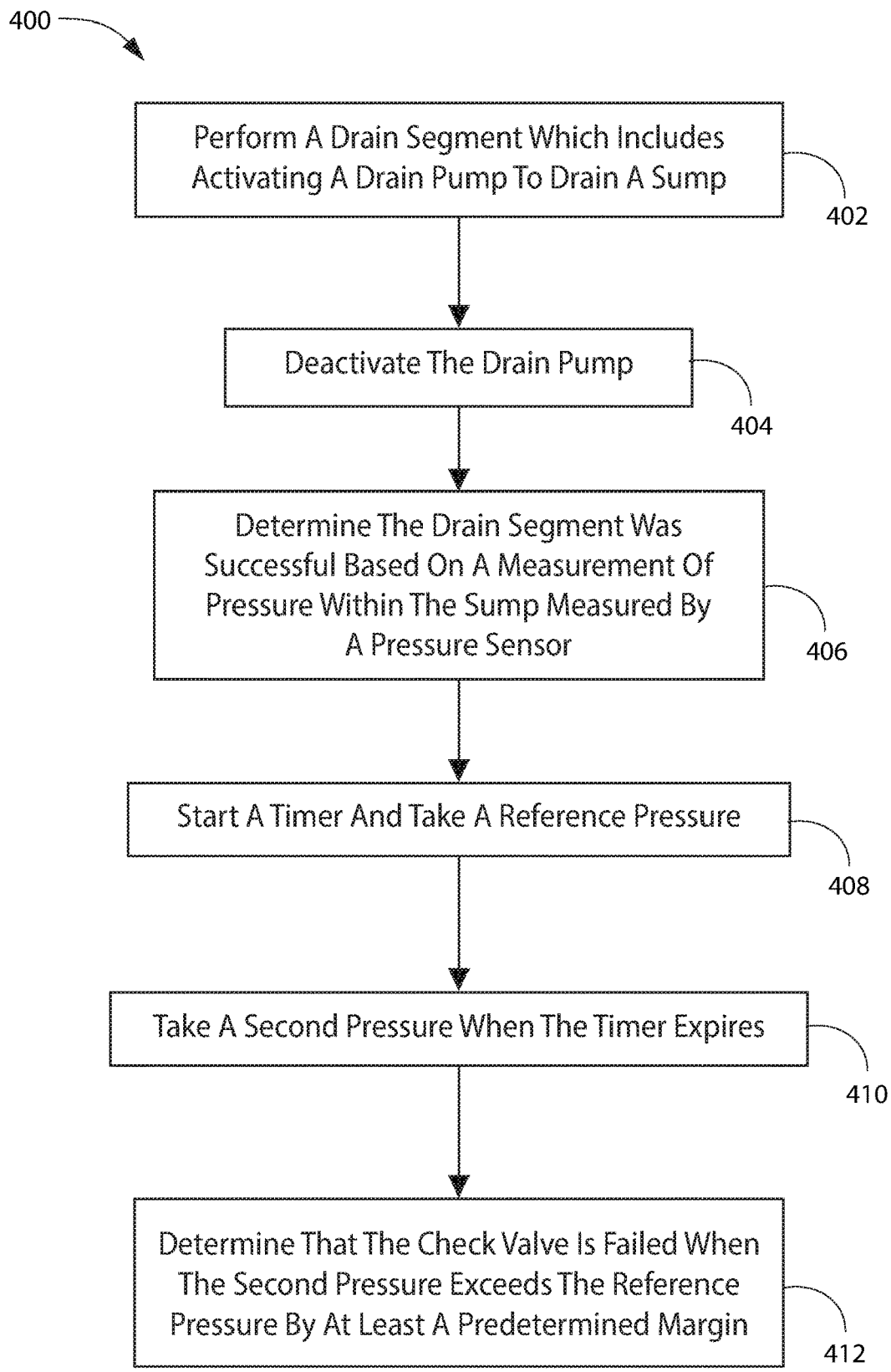
FIG. 6 provides a flow chart of a method of operating a dishwashing appliance according to one or more exemplary embodiments of the present disclosure.

Turning now to FIG. 6, an example method 400 for operating a dishwashing appliance is illustrated. Method 400 may be used to operate any suitable dishwashing appliance. As an example, some or all of the steps in method 400 may be used to operate dishwashing appliance 100 (FIG. 1). The controller 160 (FIG. 2) may be programmed to implement some or all of the steps in method 400 (e.g., as a separate valve test operation or as part of a wash operation, such as after a drain segment of the wash operation). In certain embodiments, method 400 follows (e.g., occurs subsequent to) a portion of a wash cycle or rinse cycle. For instance, method 400 may occur after a volume of wash liquid has been drained from, e.g., pumped out of, the sump 138. In various embodiments, the method 400 may be performed during a wash operation or independent of, e.g., after, a wash operation. In either case, the method 400 may be performed during or after a predetermined number of wash operations, e.g., less than all wash operations. For example, the method 400 may be performed during or after every X wash operations, where X may be between about two wash operations and about ten wash operations, such as about every three wash operations to about every eight wash operations.

The method 400 may include, at step 402, performing a drain segment. The drain segment of step 402 may include activating the drain pump. As mentioned, the drain segment may be a part of a wash operation or may be performed independently of a wash operation of the dishwashing appliance. For example, an independent drain segment according to one or more embodiments of the present disclosure may be performed after the wash operation, such as following a predetermined time interval after the wash operation is completed. The predetermined time interval may be selected to ensure that articles in the dishwashing appliance are dry, e.g., so that the liquid level in the sump 138 does not increase due to dripping from the articles which may result in or contribute to a false positive in the check valve status test. For example, the predetermined time interval may be about an hour or more, such as about two hours, after the wash cycle is completed. Additionally, in some embodiments, the drain segment of step 402 may be performed after a dry operation of the dishwashing appliance, where the dry operation may be sufficient to reduce any dripping from the articles and thereby avoid a false positive in the check valve status test. As another example, the drain segment 402 may be performed at the beginning of a wash cycle. In some embodiments, the wash cycle may include an initial drain, e.g., to remove any residual liquid in the sump from a previous operation or cycle. In such embodiments, the drain segment of step 402 may be the initial drain of the wash cycle.

At the end of the drain segment or after the drain segment, the method 400 includes deactivating the drain pump, e.g., as indicated at step 404 in FIG. 6.

In at least some embodiments, the method 400 may also include verifying a complete drain, such as determining that the drain segment was successful, e.g., as illustrated at step 406 in FIG. 6. For example, step 406 may include determining that the drain segment was successful based on a measurement of pressure within the sump 138 measured by the pressure sensor 200. For example, the measurement of pressure within the sump may be measured with a pressure sensor and/or a signal with the measured pressure embedded or encoded therein may be received by the controller from the pressure sensor. The measured pressure in step 406 may be a first pressure or an initial pressure. In such embodiments, the determination may be based on comparing the measured pressure in the sump to a predetermined threshold and the step 406 may include determining that the drain segment was successful when the measured pressure in the sump after deactivating the drain pump is less than or equal to the predetermined threshold. For example, the predetermined threshold may be a successful drain threshold.

In some embodiments, the method 400 may include taking a reference pressure when the drain segment was successful, e.g., as indicated at step 408 in FIG. 6. For example, the method 400 may include storing the first measured pressure within the sump in a memory of the dishwashing appliance, e.g., the memory may be a part of the controller 160, as a reference pressure. Additionally, in at least some embodiments, the step 408 may also include starting a timer at or about (e.g., within one second of) the same time as taking the reference pressure. In some embodiments, the method may include starting the timer immediately after measuring the first pressure. The timer may be between about one second and about ten seconds, such as between about two seconds and about six seconds, such as about five seconds.

As illustrated at 410 in FIG. 6, when the timer expires, some embodiments of the method 400 may include taking a second pressure, e.g., measuring a second pressure within the sump with the pressure sensor. In various embodiments, the second pressure may be measured after the first pressure or reference pressure, e.g., the second pressure may be measured when the timer expires as mentioned, or may be measured at another subsequent time following the first pressure measurement in additional embodiments.

In at least some embodiments, the method 400 may include determining that the check valve is failed when the second pressure exceeds the reference pressure by at least a predetermined margin. The predetermined margin may be between about 2 mmH$_2$O and about 10 mmH$_2$O, such as between about 4 mmH$_2$O and about 8 mmH$_2$O, such as about 5 mmH$_2$O. For example, the increase in pressure may indicate wash liquid flowing back into the sump through the check valve. When the rate of backflow into the sump is high, e.g., when the pressure within the sump increases by more than the predetermined margin over the duration of the timer, it may be determined that the check valve is failed.

In some embodiments, the method 400 may include flagging a failed check valve fault in response to determining that the check valve is failed. In additional embodiments, the failed check valve fault may be flagged only after multiple failed tests, such as the method may further include incrementing a counter after determining that the check valve is failed and flagging a failed check valve fault when the counter is greater than a count limit. Additionally or alternatively, the method may include initiating a user alert at a user interface of the dishwashing appliance in response to determining that the check valve is failed and/or when the counter is greater than the count limit This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a dishwashing appliance, the dishwashing appliance comprising a sump and a pressure sensor mounted to the sump with a check valve downstream from the sump along a fluid drain path and a drain pump downstream from the check valve along the fluid drain path, the method comprising:
    performing a drain segment, the drain segment comprising activating the drain pump, whereby the drain pump urges wash liquid along the fluid drain path from the sump through the check valve;
    deactivating the drain pump;
    measuring a first liquid pressure within the sump with the pressure sensor after deactivating the drain pump;
    determining the drain segment was successful based on the measured first liquid pressure when the measured first liquid pressure is less than or equal to a predetermined threshold value;
    starting a timer while the drain pump remains deactivated and taking a reference pressure after determining the drain was successful and while the drain pump continues to remain deactivated;
    measuring a second liquid pressure within the sump when the timer expires; and
    determining that the check valve is failed when the second pressure exceeds the reference pressure by at least a predetermined value.

2. The method of claim 1, wherein the drain segment is performed independently of a wash operation of the dishwashing appliance.

3. The method of claim 1, wherein the drain segment is a portion of a wash operation of the dishwashing appliance.

4. The method of claim 1, further comprising flagging a check valve fault in response to determining that the check valve is failed.

5. The method of claim 1, further comprising incrementing a counter after determining that the check valve is failed and flagging a check valve fault when the counter is greater than a count limit.

6. The method of claim 1, wherein the timer lasts about five seconds.

7. The method of claim 1, wherein the predetermined margin is equal to about 5 $mmH_2O$.

8. A method of operating a dishwashing appliance, the dishwashing appliance comprising a sump and a pressure sensor mounted to the sump with a check valve downstream from the sump along a fluid drain path and a drain pump downstream from the check valve along the fluid drain path, the method comprising:
    activating the drain pump, whereby the drain pump urges wash liquid along the fluid drain path from the sump through the check valve and discharges the wash liquid from the dishwashing appliance;
    deactivating the drain pump;
    measuring, by the pressure sensor, a first pressure within the sump after deactivating the drain pump;
    storing the first pressure in a memory of the dishwashing appliance as a reference pressure;
    measuring, by the pressure sensor, a second pressure within the sump after measuring the first pressure and while the drain pump continues to remain deactivated; and
    determining that the check valve is failed when the second pressure exceeds the reference pressure by at least a predetermined value.

9. The method of claim 8, further comprising starting a timer immediately after measuring the first pressure, wherein the step of measuring the second pressure is performed when the timer expires.

10. The method of claim 9, wherein the step of starting the timer immediately after measuring the first pressure is performed when the first pressure is less than a predetermined threshold value.

11. The method of claim 9, wherein the timer lasts about five seconds.

12. The method of claim 8, wherein the step of measuring the first pressure is performed after the drain pump is deactivated and a measured pressure within the sump is less than a second predefined value, wherein the second predefined value corresponds to a liquid height within the sump that indicates a successful drain.

13. The method of claim 8, wherein the step of activating the drain pump is performed during a drain cycle of a wash operation of the dishwashing appliance.

14. The method of claim 8, wherein the step of activating the drain pump is performed independently of a wash operation of the dishwashing appliance.

15. The method of claim 8, wherein the step of storing the first pressure in the memory of the dishwashing appliance as the reference pressure is performed when the first pressure is less than a predetermined threshold value, wherein the predetermined threshold value indicates a successful drain of the sump.

16. The method of claim 8, further comprising initiating a user alert at a user interface of the dishwashing appliance in response to determining that the check valve is failed.

17. The method of claim 8, further comprising incrementing a counter after determining that the check valve is failed and initiating a user alert at a user interface of the dishwashing appliance when the counter is greater than a count limit.

18. The method of claim 8, wherein the predetermined value is equal to about 5 mmH$_2$0.

* * * * *